United States Patent
Biswas et al.

(10) Patent No.: US 11,860,957 B2
(45) Date of Patent: Jan. 2, 2024

(54) IDENTIFYING SEARCH RESULTS USING DEEP QUERY UNDERSTANDING

(71) Applicant: VERIZON PATENT AND LICENSING INC., Basking Ridge, NJ (US)

(72) Inventors: Subham Biswas, Thane (IN); Bharatwaaj Shankar, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 166 days.

(21) Appl. No.: 17/358,535

(22) Filed: Jun. 25, 2021

(65) Prior Publication Data
US 2022/0414169 A1 Dec. 29, 2022

(51) Int. Cl.
*G06F 16/00* (2019.01)
*G06F 16/9532* (2019.01)
*G06F 16/9538* (2019.01)
*G06N 3/08* (2023.01)

(52) U.S. Cl.
CPC ...... *G06F 16/9532* (2019.01); *G06F 16/9538* (2019.01); *G06N 3/08* (2013.01)

(58) Field of Classification Search
CPC .... G06F 16/9532; G06F 16/9538; G06N 3/08
See application file for complete search history.

(56) References Cited

U.S. PATENT DOCUMENTS

| | | | |
|---|---|---|---|
| 10,769,371 B1* | 9/2020 | Barrientos | G06F 16/243 |
| 11,100,169 B2* | 8/2021 | Zheng | G06F 16/90324 |
| 2014/0032574 A1* | 1/2014 | Khan | G06F 16/245 |
| | | | 707/754 |
| 2015/0310862 A1* | 10/2015 | Dauphin | G06F 40/30 |
| | | | 704/257 |
| 2018/0090140 A1* | 3/2018 | Georges | G10L 15/142 |
| 2021/0004439 A1* | 1/2021 | Xiong | G06F 18/214 |
| 2022/0138170 A1* | 5/2022 | Misiewicz | G06N 20/00 |
| | | | 707/737 |
| 2022/0342919 A1* | 10/2022 | Sangroya | G06F 16/24522 |

OTHER PUBLICATIONS

Prakash et al, "Techniques for Deep Query Understanding", May 19, 2015, 30 Pages (Year: 2015).*

* cited by examiner

*Primary Examiner* — Jared M Bibbee

(57) ABSTRACT

An improved search engine is disclosed. The search engine receives search queries from client devices and inputs these queries into a first neural network (an action understanding model) that includes an action embedding layer. The action embedding layer can be a word embedding layer constructed using action terms. The action understanding model outputs a filter match associated with a type of filter and, in some scenarios, an action-condition pair. The action-condition pair includes an action associated with the type of filter and a condition comprising an adaptive value associated with the action. Based on the filter and, if present, action-condition pair(s), the embodiments generate a structured query and issue the structured query to a data repository (e.g., database). The search engine then returns a search results page responsive to the search query that includes the results returned by the data repository in response to the structured query.

17 Claims, 4 Drawing Sheets

IDENTIFYING SEARCH RESULTS USING DEEP QUERY UNDERSTANDING

BACKGROUND INFORMATION

Current search engine technology responds to user queries by identifying results and returning the results to a user. Some technologies allow users to further filter or sort the results based on secondary criteria manually entered by the user.

DETAILED DESCRIPTION OF EXAMPLE EMBODIMENTS

In an embodiment, methods, devices, and non-transitory computer-readable storage media are described for providing deep query understanding of textual search queries. The embodiments receive search queries from client devices. For example, the embodiments can receive search queries via a web page or other network interface that enables searching of a repository of data. Non-limiting examples of such repositories of data can include e-commerce services/websites, knowledge bases, or other similar repositories amenable to full-text searching. The embodiments parse the queries to generate a structured query that represents the underlying intent of the query, versus performing only a full-text search. For example, the embodiments can identify "actions" requested by the client in textual form and convert these actions to filters, ordering conditions, and other structured features when generating a structured query. In the embodiments, a plurality of neural networks is trained and used to identify these actions as well as other features (e.g., tags, named entities) of the query.

Specifically, the embodiments and input the queries into a first neural network (an action understanding model) that includes an action embedding layer. The action embedding layer can be a word embedding layer constructed using action terms. The action understanding model outputs a filter match associated with a type of filter and, in some scenarios, an action-condition pair. The action-condition pair includes an action associated with the type of filter and a condition comprising an adaptive value associated with the action.

Based on the filter and, if present, action-condition pair(s), the embodiments generate a structured query and issue the structured query to a data repository (e.g., database). The embodiments then return a search results page responsive to the search query that includes the results returned by the data repository in response to the structured query.

In some embodiments, the action understanding model can comprise a word embedding layer as an initial layer and a plurality of hidden layers, the hidden layers comprising bidirectional long short-term memory (LSTM) layers. In some embodiments, the hidden layers can comprise dense layers having corresponding dropout hyperparameters.

In some embodiments, the embodiments further generate a label for the search query using a first neural network and generate a named entity in the search query using a second neural network. The embodiments can then include the outputs of the first neural network and second neural network in the structured query. In some embodiments, the first neural network may include a deep contextualized word representation such as an ELMo embedding layer and the second neural network may include a Global Vectors for Word Representation (GloVe) embedding layer.

Figure 1:
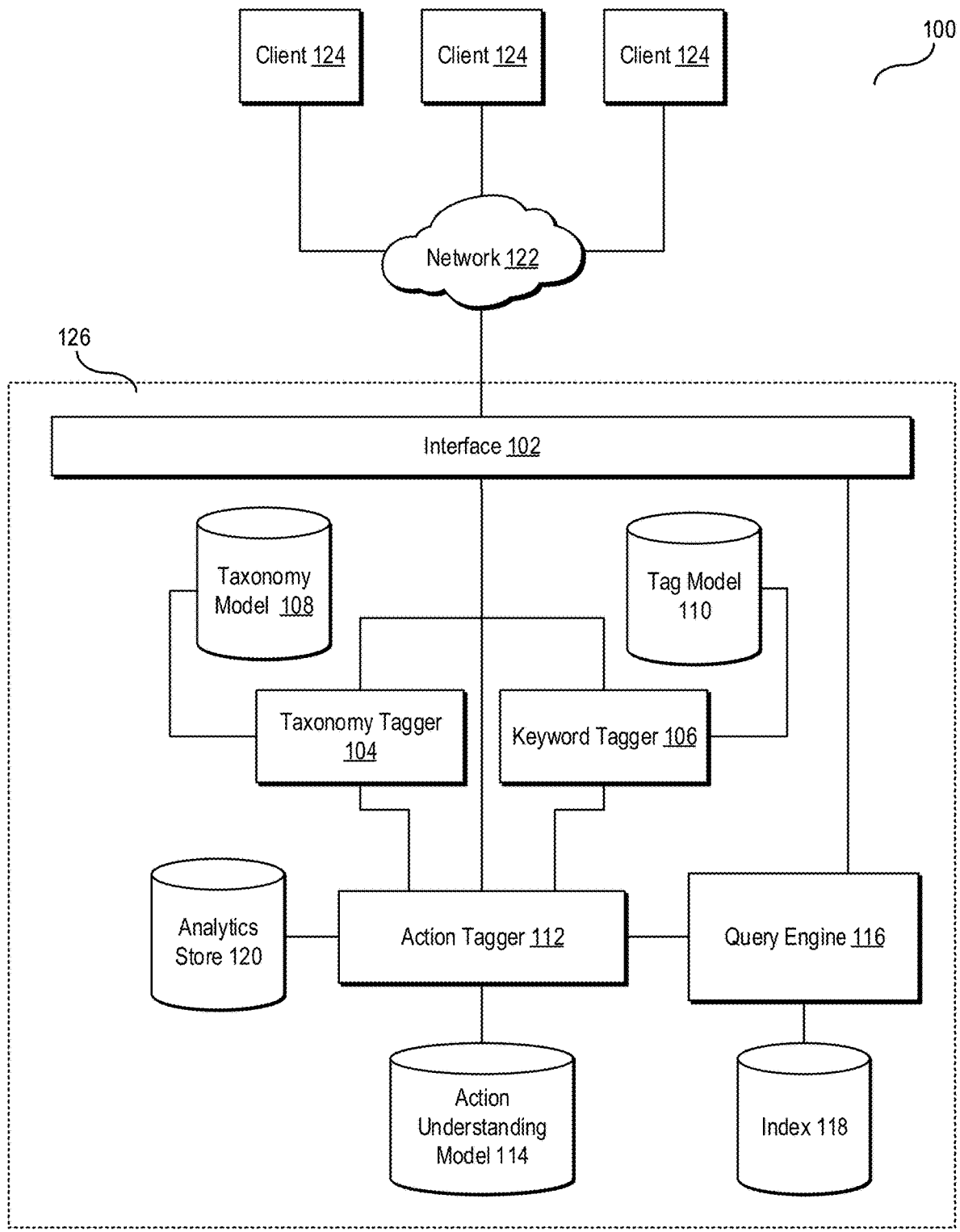
FIG. 1 is a block diagram illustrating a system for processing queries using deep query understanding according to some example embodiments.

FIG. 1 is a block diagram illustrating a system 100 for processing queries using deep query understanding according to some example embodiments.

In an embodiment, one or more client devices 124 communicate with a search engine 126 via a network 122. In an embodiment, client devices 124 can comprise desktop, laptop, mobile, or other computing devices capable of communicating over network 122. An example of a client device is provided in FIG. 7. In an embodiment, one or more client devices 124 issue network requests over network 122 to search engine 126. In one embodiment, these network requests can comprise Hypertext Transfer Protocol (HTTP) requests, although other protocols can be used. In an embodiment, the network requests can be issued via a mobile application, webpage, or desktop application. In an embodiment, the network requests can include a search query. In an embodiment, a search query can comprise a string of text data. For example, a search query can be transmitted as part of a query string in an HTTP GET request. No limitation is placed on the context in which a search query is generated and transmitted to search engine 126.

In an embodiment, network 122 comprises any local or wide area network (or similar network). For example, network 122 can comprise a public internet or another public network. Network 122 can include various devices (not illustrated) to route communications (e.g., network requests) from one or more client devices 124 to search engine 126.

In an embodiment, search engine 126 can comprise a computing device (such as that depicted in FIG. 7) or multiple computing devices. If search engine 126 comprises multiple computing devices, each component illustrated can be implemented in a dedicated computing device. In alternative embodiments, a single computing device may implement multiple components. For ease of disclosure, search engine 126 is treated, in a non-limiting manner, as a single computing device.

In an embodiment, search engine 126 includes a network interface 102, taxonomy tagger 104, keyword tagger 106, taxonomy model 108, tag model 110, action tagger 112, analytics store 120, query engine 116, index 118, and action understanding model 114.

In an embodiment, search engine 126 receives network requests via network interface 102. In one embodiment, network interface 102 may include application logic to parse network requests and extract search queries from the network requests. Network interface 102 forwards the search query to taxonomy tagger 104, keyword tagger 106, and action tagger 112.

In an embodiment, taxonomy tagger 104 is configured to input the search query into a taxonomy model 108 (in some embodiments, the first neural network) and generate one or more tags classifying the search query. In an embodiment, the tag comprises a label representing the search query's context or position within a taxonomy. For example, a search engine can maintain a taxonomy of product categories. The first neural network can thus be trained using the taxonomy as a label set and, for example, a set of corresponding queries as the features. Thus, the first neural network can be configured to return a tag or category in response to a search query, and thus the tag or category can comprise the context or position within the taxonomy of the search query. In an embodiment, the taxonomy tagger 104 and taxonomy model 108 perform the functions described in step 204, the disclosure of which is not repeated herein.

In an embodiment, keyword tagger 106 is configured to input the search query into a tag model 110 (also referred to as the second neural network) and generate one or more named tags or named entities included in the search query. In an embodiment, the named entities comprise key-value pairs describing types of entities and their corresponding values. In an embodiment, the keyword tagger 106 and tag model 110 perform the functions described in step 206, the disclosure of which is not repeated herein. In some embodiments, the tag model 110 can comprise a named entity recognition (NER) model.

In an embodiment, action tagger 112 is configured to input the search query into an action understanding model 114 (also referred to as the third neural network) to identify one or more action-condition pairs in the search query. In an embodiment, an action-condition pair can comprise a word or phrase in a search that indicates an action and a corresponding condition (e.g., factor affecting the action). In an embodiment, an action-condition pair can comprise an intent to manipulate search results. For example, the action-condition pair can comprise a filter or ordering criteria that are expressed in text form (e.g., "find the cheapest mobile phone," where "cheapest" comprises an example action term corresponding to an ordering condition).

In an embodiment, the action understanding model 114 can generate one or more named filters and action-condition pairs included in the search query. In an embodiment, the filter comprises a label corresponding to a filter condition included in a search query. In an embodiment, the action-condition pair comprises a type of action and a corresponding condition or value to apply to the action. In an embodiment, the action tagger 112 and action understanding model 114 perform the functions described in step 208, the disclosure of which is not repeated herein.

In an embodiment, taxonomy tagger 104, keyword tagger 106, and action tagger 112 may be implemented as software and/or hardware devices configured to load the corresponding neural networks (e.g., 108, 110, 114) and input the search query into a corresponding model. Corresponding, neural networks (e.g., 108, 110, 114) may comprise a database or other storage medium storing neural network parameters and hyperparameters. During operation, these hyperparameters can be loaded and executed by the corresponding taggers (104, 106, 112). In an embodiment, neural networks (e.g., 108, 110, 114) can be continuously retrained and updated in the database or other storage medium for use by the taggers (104, 106, 112).

In an embodiment, the action tagger 112 may transmit the output of the action understanding model to an analytics store 120. In one embodiment, analytics store 120 stores a timestamped record of search queries and the results of the action understanding model. This record can then be used to monitor user search activity over time. In some embodiments, the analytics store 120 may group results by session to thus capture a user's search query progression as the search engine 126 returns search results.

In an embodiment, the action tagger 112 is further operable to transmit a deep query understanding (DQU) document to query engine 116. In one embodiment, the DQU document combines the outputs of the taxonomy tagger 104, keyword tagger 106, and action tagger 112 into a single structured document that describes the search query. In some embodiments, the taxonomy tagger 104, keyword tagger 106, and action tagger 112 may each transmit their outputs directly to the query engine 116. Details of DQU documents are described further herein.

In an embodiment, the query engine 116 parses a DQU document and (optionally) the original search query to generate a search query accessing index 118. In an embodiment, the query engine 116 may generate a structured query language (SQL) statement or similar statement to access index 118. In an embodiment, index 118 can comprise a relational database, a NoSQL database, or another data store capable of handling ad hoc queries. As illustrated, the query engine 116 can receive the results of the structured query from index 118 and return search results to one or more client devices 124. In one embodiment, the network interface 102 can process the raw search results and generate a response for one or more client devices 124. In some embodiments, the response can comprise a search results web page, serialized response (e.g., JavaScript Object Notation, JSON, or eXtensible Markup Language, XML, response). Since the results of the structured query include the action-condition pairs determined via action tagger (112), the accuracy and relevancy of the results can be improved and further filtering, ordering, and other operations may not be required. Thus, the system 100 can avoid subsequent "follow up" searches that reorder an initial set of search results. In an embodiment, the query engine 116 (and network interface 102) may perform some or all of the operations described in connection with step 210 and FIGS. 3 through 6.

Figure 2:
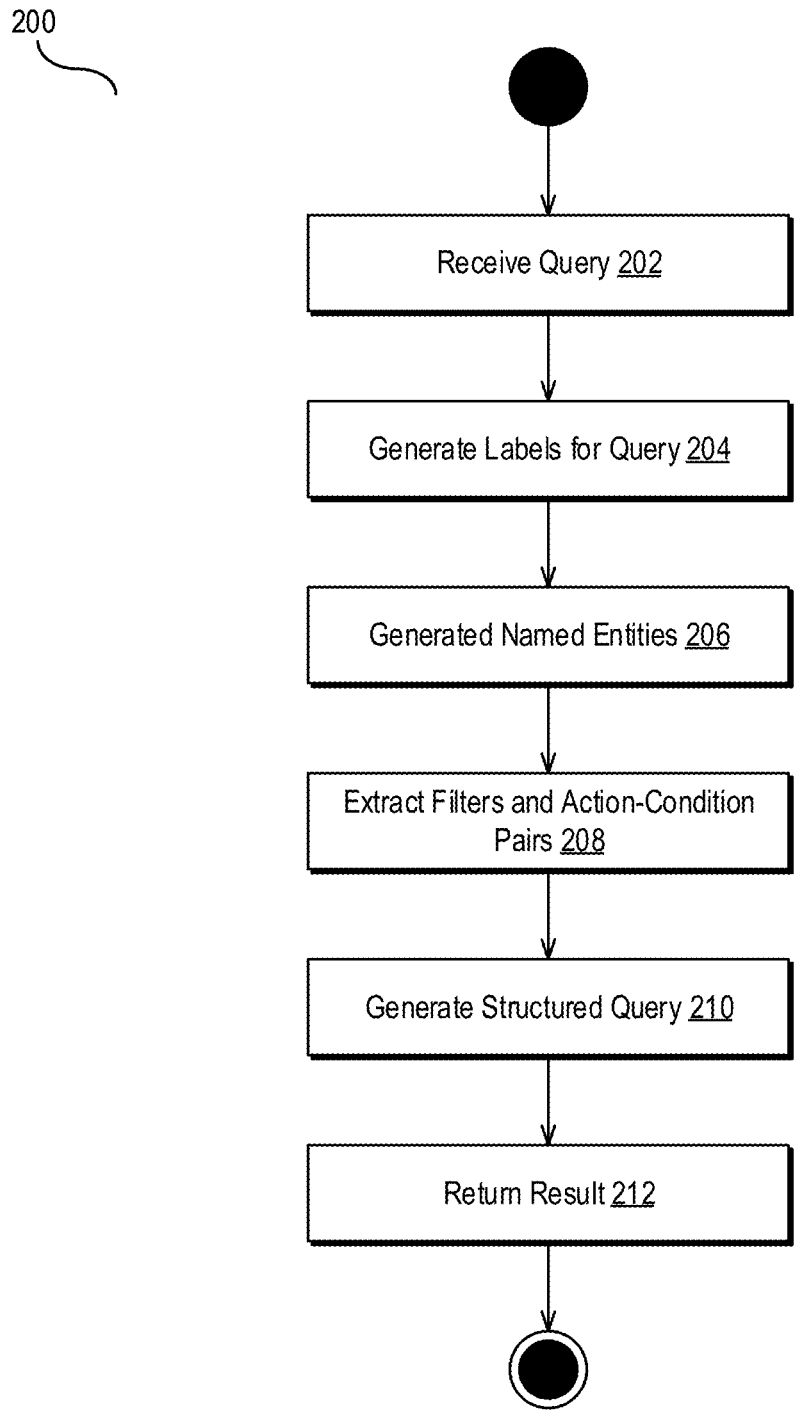
FIG. 2 is a flow diagram illustrating a method for processing queries using deep query understanding according to some example embodiments.

FIG. 2 is a flow diagram illustrating a method 200 for processing queries using deep query understanding according to some example embodiments.

In step 202, method 200 can comprise receiving a search query.

In one embodiment, method 200 receives a search query from a remote computing device (i.e., client device). In an embodiment, the search query can comprise a text string. In other embodiments, method 200 can receive other content types as queries (e.g., images or audio). In some embodiments, if the query comprises a non-text query, method 200 can further comprise extracting text from the non-text query. For example, method 200 can convert audio data to text data or perform optical character recognition on image or video content. In an embodiment, method 200 can receive the search query over a network (e.g., over a public internet via a Hypertext Transfer Protocol request).

In step 204, method 200 can comprise generating one or more labels for the search query.

In an embodiment, method 200 can generate a label representing the search query's context or position within a taxonomy. For example, a search engine can maintain a taxonomy of product categories. The first neural network can thus be trained using the taxonomy as a label set and, for example, a set of corresponding queries as the features. Thus, the first neural network can be configured to return a tag or category in response to a search query, and thus the tag or category can comprise the context or position within the taxonomy of the search query. In one embodiment, method 200 can use a machine learning model to assign a label to a search query. In one embodiment, method 200 can assign a single label to a search query. In some embodiments, method 200 can assign multiple distinct labels to a search query.

In one embodiment, method 200 can generate labels using a first neural network, including an ELMo embedding layer. In some embodiments, method 200 can use an ELMo embedding layer to ensure that method 200 can process unknown words. However, method 200 can use other embedding techniques capable of labeling unknown words in search queries. Generally, method 200 can use a neural network with embedding layers containing multiple pre-stored words but also capable of processing unknown words by identifying words similar to the pre-stored words, or by identifying the unknown words based on character-level analysis of the unknown words.

In one embodiment, the first neural network comprises a plurality of bi-directional long short-term memory (LSTM) layers (e.g., hidden layers). In one embodiment, the layers can comprise dense layers. In one embodiment, a dense layer can comprise a non-linear layer in a neural network. In general, a non-linear layer comprises a linear function that passes its output through a non-linear activation function such as a hyperbolic tangent, rectified linear unit (ReLU), or rectifier activation function. In some embodiments, method 200 can additionally utilize dropouts in the first neural network. In one embodiment, dropouts can comprise any technique to prevent overfitting of the first neural network. In one embodiment, method 200 can implement dropouts in one, some, or all layers of the first neural network. In general, a dropout functionality of a layer selectively disables a portion of the artificial neurons in the first neural network. In some embodiments, method 200 can implement a per-layer dropout as a hyperparameter that specifies the probability at which outputs of the layer are dropped out, or inversely, the probability at which outputs of the layer are retained.

By using the first neural network, method 200 can assign tags representing classifications to search queries. For example, the queries "iPhone 12 under $1000" and "Latest Samsung mobile phone under $1,500" can both be tagged as (for example) "Phone" in a taxonomy of query classifications. Method 200 can tag more complicated queries with multiple tags. For example, method 200 can tag the query "why was my bill so high despite having an international plan" as both "billing" and "international plan." Method 200 can then use the tags generated in step 204 in downstream processing steps described herein.

In step 206, method 200 can comprise generating one or more named entities for the search query. In a non-illustrated embodiment, method 200 can execute step 206 in parallel with step 204.

In one embodiment, method 200 can use a tag model, such as a named-entity recognition (NER) model, to generate one or more entities present within a textual query. In one embodiment, the tag model comprises a second neural network. In one embodiment, the second neural network can include a Global Vector Word Representation (GloVe) embedding layer and one or more bi-directional LSTM layers. In some embodiments, the second neural network can utilize dense layers and dropouts, as discussed previously and not repeated herein.

Additionally, in some embodiments, the second neural network can utilize conditional random fields (CRFs). CRF is an undirected graphical model that method 200 can use to model named entities as a sequence-prediction problem. In an embodiment, CRF estimates the conditional probability of values on output nodes (e.g., labels), given values assigned to input nodes (e.g., a sequence of words). In the context of NER, CRF defines a conditional probability of a label sequence based on total probability over all possible label sequences. In an embodiment, the use of CRF enables the distinction between entities based on the sequence of terms.

In step 208, method 200 can extract one or more filters and corresponding action-condition pairs from a query.

In one embodiment, step 208 can comprise identifying one or more filters based on the text content of the query. In some embodiments, one or more of the identified filters are associated with action-condition pairs. In some embodiments, a given filter may not have a corresponding action-condition pair. For example, for the query "iPhone 12 under $1000", the filter can be "currency," the action can be "under," and the value of the condition to apply to the action can be "$1000." As illustrated in this example, a filter and action-condition pair can be considered a type of filter to apply to a search query to limit the results. As another example, a query "list of lowest price phones" can be mapped to a filter of "list" and an action of "lowest price." Here, the filter would correspond to a sort filter to be applied to the label (identified in step 204) "phone." As another example, the query "Latest Samsung mobile under $1500" may map to two filters: "latest" and "currency." As with the first example, the filter "currency" can be associated with the action "under" and condition "$1500." However, the filter "latest" may not have a corresponding action-condition pair or may have a constant action-condition pair.

In one embodiment, method 200 can identify filters and action-condition pairs by inputting the text query into a third neural network. In an embodiment, an action-condition pair can comprise a word or phrase in a search that indicates an action and a corresponding condition (e.g., a factor of the action). In an embodiment, an action-condition pair can comprise an intent to manipulate search results. For example, the action-condition pair can comprise a filter or ordering criteria that are expressed in text form (e.g., "find the cheapest mobile phone," where "cheapest" comprises an example action term corresponding to an ordering condition). In one embodiment, the third neural network includes an action embedding layer trained for filter detection based on a pre-generated training set of possible filters and corresponding action-condition pairs. An example of training data is provided in Table 1:

TABLE 1

| Filter ID | Filter | Action-Condition ID | Action | Condition |
|---|---|---|---|---|
| 1 | phone memory | 1 | equals | 512 GB |
| ... | ... | ... | ... | ... |
| 500 | latest | 22 | equals | most expensive |
| ... | ... | ... | ... | ... |

TABLE 1-continued

| Filter ID | Filter | Action-Condition ID | Action | Condition |
|---|---|---|---|---|
| 999 | currency | 33 | between | [$300, $500] |
| 1000 | currency | 34 | under | $1000 |

Here, each filter is given a unique ID ("Filter ID"), and each corresponding action-condition pair for a given filter is given an ID ("Action-Condition ID"). As illustrated, a given filter (e.g., "currency") can be associated with multiple actions (e.g., "between" and "under"). In an embodiment, the condition column can comprise an adaptive field, and the specific values displayed are not required.

In an embodiment, the filter, action, and condition (or each individually) can be used to construct an embedding matrix for use when training an embedding layer (e.g., an ELMo or GloVe embedding layer, or the like) of the third neural network. That is, the precomputed filters and action-condition pairs are used as the word embedding for an embedding layer. In one embodiment, the training set can be built manually. However, by using an embedding layer, the training set need only include one example of each type of action. For example, an example of "under" would capture synonyms such as "less than," "no more than," etc. In some embodiments, the word embeddings generated using the training data can be combined with existing word embeddings. In general, the embedding layer converts an input text query into a sequence of matching word embeddings in a single vector. In some embodiments, this vector can then be input into one or more dense bidirectional LSTM layers and used to predict filters and action-condition pairs in the query.

In one embodiment, the third neural network used in step 208 can comprise the embedding layer and a plurality of hidden bi-directional LSTM layers. In some embodiments, one or more of the hidden layers can comprise dense layers, as discussed previously. Further, dropouts can be used to disable portions of layers or entire layers, as discussed previously.

In an embodiment, method 200 can input a text query into the third neural network trained using the above action embeddings. In an embodiment, method 200 receives an output vector that includes a filter match as well as an action-condition pair.

The following non-limiting examples are provided to illustrate the operation of steps 204, 206, and 208. In the first example, method 200 receives a query "iPhone 12 under $1000." When executing step 204, method 200 can identify a label ({type: 'Phone'}) for the query by inputting the query into the first neural network. Next, method 200 executes step 206 on the query by inputting the query into the second neural network and generates a plurality of named entities: ({brand: 'Apple,' device: 'iPhone 12', value: '1000'}). Finally, in step 208, method 200 inputs the query into the third neural network and obtains filters and action-condition pairs ({filter: 'currency'} and {action: 'under,' condition: '1000'}). In one embodiment, these outputs may be combined to form a deep query understanding (DQU) document:

```
{
    type: 'Phone',
    entities: {
        brand: 'Apple',
        device: 'iPhone 12',
        value: '1000'
    },
    actions: [
        {
            filter: 'currency',
            action: 'under',
            condition: '1000'
        }
    ]
}
```

Example 1

In a second example, method 200 receives a query "Latest Samsung mobile under $1500." When executing step 204, method 200 can identify a label ({type: 'Phone'}) for the query by inputting the query into the first neural network. Next, method 200 executes step 206 on the query by inputting the query into the second neural network and generates a plurality of named entities: ({brand: 'Samsung', value: '1500'}). Finally, in step 208, method 200 inputs the query into the third neural network and obtains filters and action-condition pairs ({filter: ['currency', 'latest'] } and {action: 'under', condition: '1500'}). Although illustrated in aggregated form, in an embodiment, method 200 associates the single action-condition pair to the currency filter. In one embodiment, these outputs may be combined to form a deep query understanding (DQU) document:

```
{
    type: 'Phone',
    entities: {
        brand: 'Samsung',
        value: '1500'
    },
    actions: [
        {
            filter: 'currency',
            action: 'under',
            condition: '1500'
        },
        {
            filter: 'latest'
        }
    ]
}
```

Example 2

In step 210, method 200 generates a structured query (with filters) from the neural network outputs. In one embodiment, method 200 can generate the structured query using only the output from the third neural network. In other embodiments, the first and second neural networks may also be used to generate the structured query. In some embodiments, method 200 can also use original textual query to generate the structured query. As used herein, a structured query can comprise any technique for accessing a repository of data (e.g., a relational database). Method 200 can generate database queries by generating, as one example, structure query language (SQL) statements. For example, the DQU document of Example 1 can be converted into the following SQL statement:

SELECT * FROM products WHERE TYPE="Phone" AND BRAND="Apple" AND DEVICE="iPhone 12" AND PRICE<=1000;

Here, the outputs of the first and second neural network are converted into WHERE conditions of an SQL statement. Notably, in some embodiments, method 200 can selectively utilize a subset of the first and second neural network outputs (e.g., the "value" entity from the second neural network is omitted). Further, the output of the third neural network is likewise converted into a WHERE condition (PRICE<=1000). Thus, the SQL statement automatically includes a filter condition based on the underlying text query.

As a second example, the DQU document of Example 2 can be converted into the following SQL statement:
SELECT * FROM products WHERE TYPE="Phone" AND BRAND="Samsung" AND PRICE<=1500 ORDER BY release_date DESC;

Here, method 200 can convert the "currency" action into a WHERE clause (PRICE<=1500) and the "latest" action into an ORDER BY clause (ORDER BY release_date DESC). As illustrated, in some embodiments, filters can correspond to either filters or sorting criteria, and indeed any structure for modifying the return results of a structured query. Further, the keys of the DQU document may be mapped to the underlying data repository keys (e.g., "value" may be mapped to "price"). In one embodiment, the condition of the ORDER BY clause can be formulated based on the type of the condition. For example, if the condition is a price (e.g., "$1000") then the ORDER BY clause can be adjusted to sort by price. Similarly, if the condition is a rating (e.g., "four stars or more"), the ORDER BY clause can be adjusted to sort by a rating. As another example, if the condition is a superlative (e.g., "best"), then the ORDER BY Clause can be adjusted to sort by the popularity or relevance. Although short conditions are provided as example, the disclosed embodiments are not limited as such. For example, the query "iphone case that ships as quick as possible" can be used to identify an action-condition "ships as quick as possible" wherein the action is associated with an ORDER BY clause and the condition is the shipping date (e.g., "ORDER BY estimated_ship_date ASC").

As part of step 210, method 200 can then issue the query to the data repository and receive a set of results. Method 200 can then generate a result page to present the user in response to the query. In step 212, method 200 transmits this results page back to the user in response to the query. Since the results of the structured query include the detected action-condition pairs, the accuracy and relevancy of the results can be improved and further filtering, ordering, and other operations may not be required. Thus, method 200 can avoid subsequent "follow up" searches that reorder an initial set of search results.

As will be discussed, the generation of a query in step 210 is only one example of how the outputs of the first, second, and third neural networks can be used. Additional, non-limiting examples are provided further herein.

Figure 3:
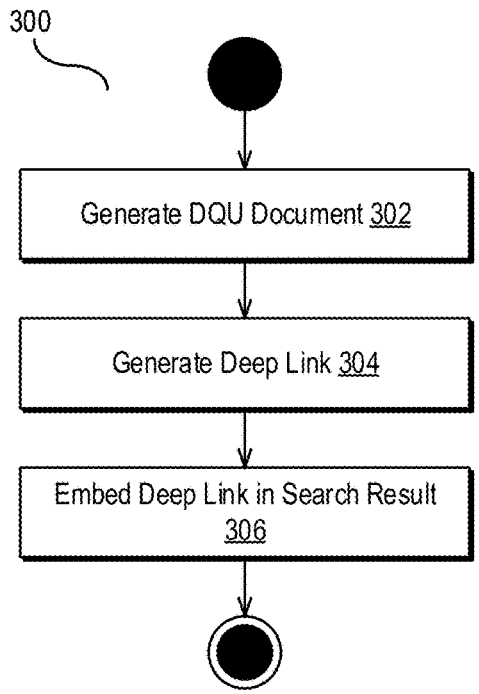
FIG. 3 is a flow diagram illustrating a method for generating a link in a search results page using deep query understanding according to some example embodiments.

FIG. 3 is a flow diagram illustrating a method for generating a link in a search results page using deep query understanding according to some example embodiments.

In step 302, method 300 can comprise generating a DQU document for a search query. In an embodiment, method 300 generates the DQU document as discussed in steps 204, 206, and 208 of FIG. 2. In some embodiments, the DQU document can be generated solely based on identified filters and action-condition pairs. Alternatively, in some embodiments, the DQU document can be generated based on the outputs of the first and/or second neural networks as well.

In step 304, method 300 can comprise generating a deep link associated with the search query. In an embodiment, a deep link comprises a hyperlink to a specific webpage, network application, or portion of a mobile application. As an example, method 300 can generate a deep link directly to a chat feature of a mobile app or website, to a chatbot, or to a short message service (SMS) message feature of a website. In one embodiment, a deep link includes a protocol (e.g., HTTP or a mobile application-specific protocol) and a path to the target application.

In one embodiment, data from the DQU document could be included in the deep link to enable processing by the targeted application. For example, using the DQU in Example 1, a deep link to a sales chatbot can be constructed as: telco://chatbot/sales?brand=Apple&device=iPhone12&price=>1000. Here, the root "telco://chatbot/sales" identifies the type of chatbot to invoke while the query string includes the DQU fields. The chatbot can parse this field to identify a question-answer set that can be used to assist a customer specifically with respect to the identified query. For example, a script tailored based on the query string can be used to assist the customer via the chatbot. In a similar manner, the query string could alternatively be used to populate a terminal display for a real-world customer service agent. Then, when the user selects the link, the customer service agent is provided the DQU fields to improve the customer service experience.

In step 306, method 300 comprises embedding the deep link in a search results page. In some embodiments, method 300 can include the deep link along with search results such as those generated in steps 210 and 212 of FIG. 2. In one embodiment, method 300 can include the deep link alongside standard search results. In another embodiment, method 300 can include the deep link in a separate area of the search engine results page. In some embodiments, method 300 can return the deep link as part of a serialized response (e.g., JSON or XML) to enable, for example, use by mobile applications.

Figure 4:
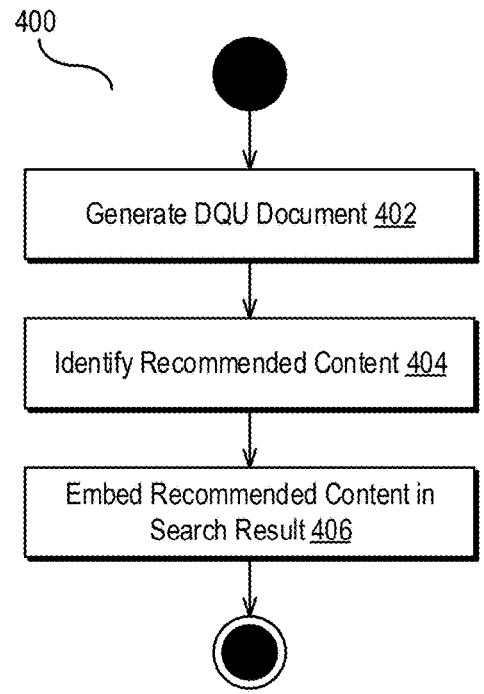
FIG. 4 is a flow diagram illustrating a method for generating a recommendation for inclusion in a search results page using deep query understanding according to some example embodiments.

FIG. 4 is a flow diagram illustrating a method for generating a recommendation for inclusion in a search results page using deep query understanding according to some example embodiments.

In step 402, method 400 can comprise generating a DQU document for a search query. In an embodiment, method 400 generates the DQU document as discussed in steps 204, 206, and 208 of FIG. 2. In some embodiments, the DQU document can be generated solely based on identified filters and action-condition pairs. Alternatively, in some embodiments, the DQU document can be generated based on the outputs of the first and/or second neural networks as well.

In step 404, method 400 can comprise identifying recommended content based on the DQU document. In one embodiment, method 400 can use the DQU to identify one or more items of recommended content related to search results. In one embodiment, method 400 can execute step 404 in combination with identifying search results in steps 210 and 212 of FIG. 2.

In one embodiment, the recommended content can comprise a digital advertisement, sponsored listing, or other digital content. In one embodiment, step 404 can comprise allowing advertisers to bid on the DQU document fields to select the recommended content. For example, in existing recommendation systems, advertisers bid on keywords in a query. However, by utilizing DQU document fields instead of raw keywords, method 400 can allow advertisers to bid on finer grain concepts. As a result, the relevancy of recommended content is enhanced as compared to existing keyword bid processes. Further, since word embedding is used, method 400 can allow advertisers to bid on unknown words (i.e., by exploiting the synonymy of word embedding models). For example, an advertiser may bid on all queries directed to "phones" that also involve price points "under"

$1000. If a user queries for "phones less than 1000", the advertiser's bid will still match this query despite the use of "less than" versus "under."

In step 406, method 400 comprises embedding the recommended content in a search results page. In some embodiments, method 400 can include the recommended content along with search results such as those generated in steps 210 and 212 of FIG. 2. In one embodiment, method 400 can include the recommended content alongside standard search results. In another embodiment, method 400 can include the recommended content in a separate area of the search engine results page. For example, method 400 can insert the recommended content in a dedicated advertising region of the search engine results page. In some embodiments, method 400 can return the recommended content as part of a serialized response (e.g., JSON or XML) to enable, for example, use by mobile applications.

Figure 5:
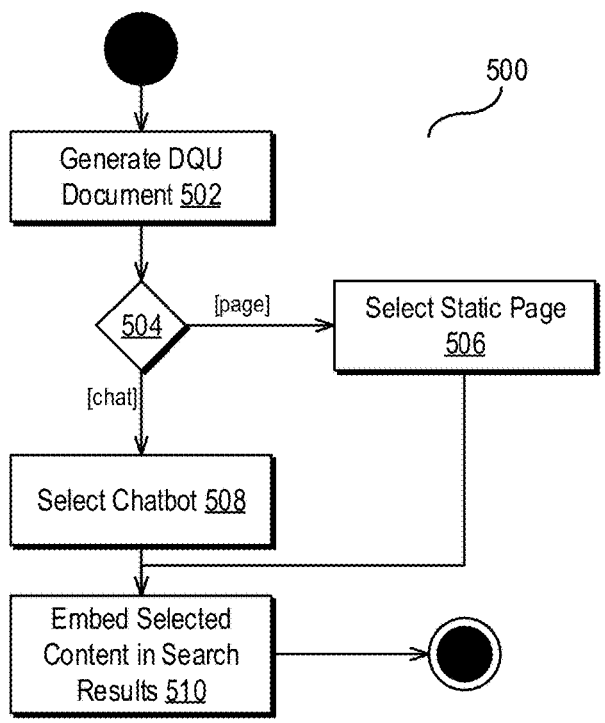
FIG. 5 is a flow diagram illustrating a method for identifying a support option for inclusion in a search results page using deep query understanding according to some example embodiments.

FIG. 5 is a flow diagram illustrating a method for identifying a support option for inclusion in a search results page using deep query understanding according to some example embodiments.

In step 502, method 500 can comprise generating a DQU document for a search query. In an embodiment, method 500 generates the DQU document as discussed in steps 204, 206, and 208 of FIG. 2. In some embodiments, the DQU document can be generated solely based on identified filters and action-condition pairs. Alternatively, in some embodiments, the DQU document can be generated based on the outputs of the first and/or second neural networks as well.

In step 504, method 500 comprises determining whether a static page matches the DQU document.

In one embodiment, method 500 includes a taxonomy of static pages. Thus, in some embodiments, the DQU document fields can be used to query this taxonomy to identify one or more static pages. In an embodiment, this process can be performed in a manner similar to step 210 of FIG. 2. In one embodiment, the original query can also be used to perform a full-text search of the content of the static pages to further filter the results. For example, the query "why does my battery die too quickly" can be mapped (via the first neural network) to a "phone" label and (via the second neural network) to the tag "{component: 'battery'}." In one embodiment, the static page taxonomy can comprise a plurality of tags for each static page. Thus, method 500 can issue a query such as the pseudo-SQL statement: SELECT * FROM static_pages WHERE tags INCLUDE 'battery' AND 'phone'. In some embodiments, the output of the third neural network can be used as a further condition in the query.

In some scenarios, such a query may not return any results. If so, method 500 continues to step 508. However, if the query returns at least one result, method 500 continues to step 506.

In step 506, method 500 can comprise selecting a static page. In an embodiment, method 500 can select the static page from the results returned from the query. In one embodiment, method 500 can transmit a single page to the user. Thus, in response to a query, method 500 can direct the user to a specific page, reducing page loads. Further, in some embodiments, method 500 can route the user to a specific section of a web page (via HTML anchor tags). In this embodiment, method 500 can further comprise searching a web page using the DQU document fields to find a matching anchor (e.g., "<a name='battery'> Battery Issues</a>") and then rewrite a uniform resource locator (URL) to match this anchor (e.g., http://example.com/faq#battery) and forward the user to that URL. In other embodiments, method 500 may order the results based on relevancy and present the ordered results to the user.

In step 508, if method 500 determines no static pages match the query. In this scenario, method 500 may automatically direct the user to a chatbot. As described in FIG. 3, the chatbot can be provided to the user via a deep link that includes the fields from the DQU document. The chatbot can then be loaded based on the underlying fields of the query to improve the performance. Alternatively, or in conjunction with the foregoing, method 500 can also route the user to a customer service representative (as discussed in FIG. 3) and provide the DQU document fields to the representative to improve the speed of service.

In step 510, method 500 comprises embedding the selected content in a search results page. In some embodiments, method 500 can include the selected content along with search results such as those generated in steps 210 and 212 of FIG. 2. In one embodiment, method 500 can include the selected content alongside standard search results. In another embodiment, method 500 can include the selected content in a separate area of the search engine results page. In some embodiments, method 500 can return the selected content as part of a serialized response (e.g., JSON or XML) to enable, for example, use by mobile applications.

Figure 6:
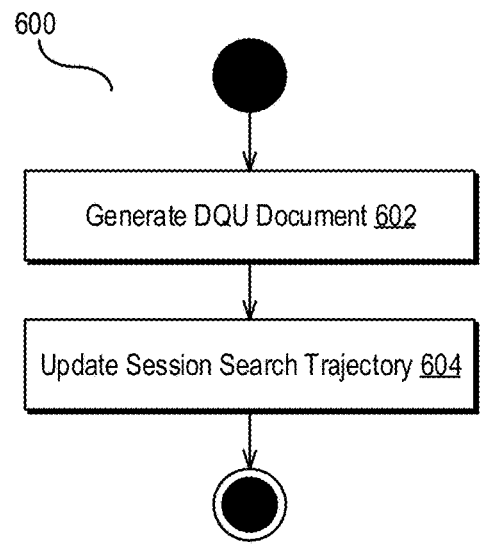
FIG. 6 is a flow diagram illustrating a method for monitoring user search queries using deep query understanding according to some example embodiments.

FIG. 6 is a flow diagram illustrating a method for monitoring user search queries using deep query understanding according to some example embodiments.

In step 602, method 600 can comprise generating a DQU document for a search query. In an embodiment, method 600 generates the DQU document as discussed in steps 204, 206, and 208 of FIG. 2. In some embodiments, the DQU document can be generated solely based on identified filters and action-condition pairs. Alternatively, in some embodiments, the DQU document can be generated based on the outputs of the first and/or second neural networks as well.

In step 604, method 600 can comprise updating a session search trajectory. In one embodiment, each search query from a user can be timestamped and stored in a database or similar repository (e.g., analytics store 120). Further, the DQU document can be associated with the search query.

In one embodiment, method 600 further assigns a session identifier to each query/DQU document to enable session-level tracking of user search histories. In one embodiment, the query, DQU document, and session identifier can be used by downstream applications to monitor the change of user queries over time. For example, a single session can be used to track how a user changes their search terminology until finding a suitable result. Notably, since DQU document fields are used, method 600 can account for differing action terminology (e.g., by assigning various synonyms to a single action term), which enables a higher quality (i.e., less noisy) and more semantically accurate record of how user search queries change over time.

Figure 7:
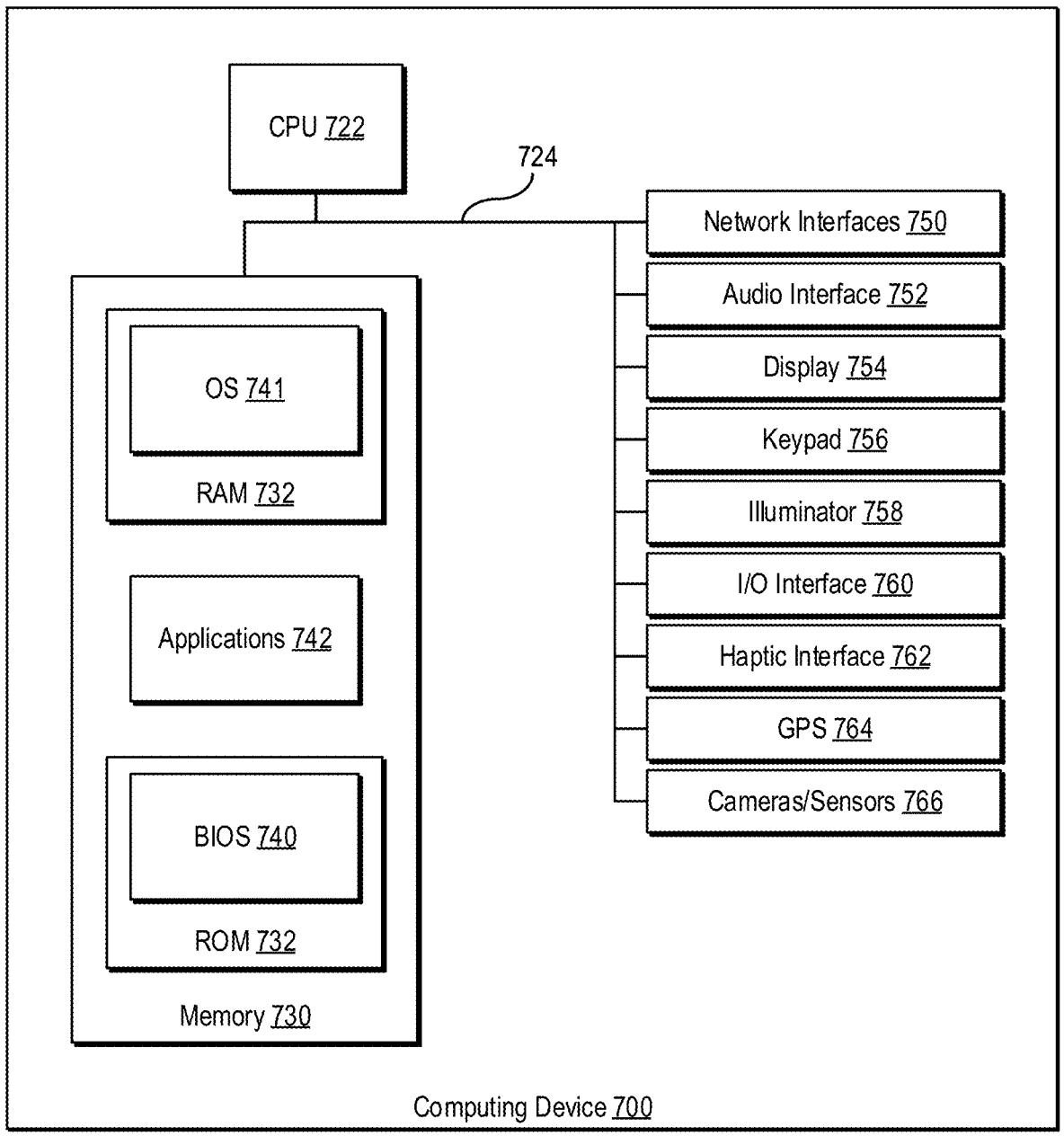
FIG. 7 is a block diagram illustrating a computing device showing an example of a client or server device used in the various embodiments.

FIG. 7 is a block diagram illustrating a computing device showing an example of a client or server device used in the various embodiments.

The computing device 700 can include more or fewer components than those shown in FIG. 7, depending on the deployment or usage of the computing device 700. For example, a server computing device, such as a rack-mounted server, may not include an audio interface 752, display 754, keypad 756, illuminator 758, haptic interface 762, Global Positioning System receiver 764, or sensors 766 (e.g., camera, temperature sensor, etc.). Some devices can include additional components not shown, such as graphics processing unit (GPU) devices, cryptographic coprocessors, artificial intelligence (AI) accelerators, or other peripheral devices.

As shown in the figure, the computing device 700 includes a central processing unit (CPU) 822 in communication with a mass memory 730 via a bus 724. The computing device 700 also includes a network interface 750, an audio interface 752, a display 754, a keypad 756, an illuminator 758, an input/output interface 760, a haptic interface 762, a Global Positioning System receiver 764 and cameras or sensors 766 (e.g., optical, thermal, or electromagnetic sensors). Computing device 700 can include sensors 766. The positioning of the sensors 766 on the computing device 700 can change per computing device 700 model, per computing device 700 capabilities, and the like, or some combination thereof.

In some embodiments, the CPU 722 can comprise a general-purpose CPU. The CPU 722 can comprise a single-core or multiple-core CPU. The CPU 722 can comprise a system-on-a-chip (SoC) or a similar embedded system. In some embodiments, a GPU can be used in place of, or in combination with, a CPU 722. Mass memory 730 can comprise a dynamic random-access memory (DRAM) device, a static random-access memory device (SRAM), or a Flash (e.g., NAND Flash) memory device. In some embodiments, mass memory 730 can comprise a combination of such memory types. In one embodiment, the bus 724 can comprise a Peripheral Component Interconnect Express (PCIe) bus. In some embodiments, the bus 724 can comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741) for controlling the operation of the computing device 700.

Applications 742 can include computer-executable instructions which, when executed by the computing device 700, perform any of the methods (or portions of the methods) described previously in the description of the preceding figures. In some embodiments, the software or programs implementing the method embodiments can be read from a hard disk drive (not illustrated) and temporarily stored in RAM 732 by CPU 722. CPU 722 can then read the software or data from RAM 732, process them, and store them to RAM 732 again.

The computing device 700 can optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 can be coupled to a speaker and microphone (not shown) to enable telecommunication with others or generate an audio acknowledgment for some action. Display 754 can be a liquid crystal display (LCD), gas plasma, light-emitting diode (LED), or any other type of display used with a computing device. Display 754 can also include a touch-sensitive screen arranged to receive input from an object such as a stylus or a digit from a human hand.

Keypad 756 can comprise any input device arranged to receive input from a user. Illuminator 758 can provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The Global Positioning System receiver 764 can determine the physical coordinates of the computing device 700 on the surface of the Earth, which typically outputs a location as latitude and longitude values. Global Positioning System receiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 can communicate through other components, provide other information that can be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter can, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, components, or systems. Accordingly, embodiments can, for example, take the form of hardware, software, firmware, or any combination thereof (other than software per se). The following detailed description is, therefore, not intended to be taken in a limiting sense.

Throughout the specification and claims, terms can have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes can be made thereto, and additional embodiments can be implemented without departing from the broader scope of the example embodiments as set forth in the claims that follow. The specification and drawings are accordingly to be regarded in an illustrative rather than restrictive sense.

What is claimed is:

1. A method comprising:
    inputting a search query from a client into an action understanding model, the action understanding model including an action embedding layer, the action embedding layer comprising a word embedding layer constructed using a plurality of action terms;
    receiving, from the action understanding model, a filter match, the filter match including a type of filter and an action-condition pair, the action-condition pair comprising an action associated with the type of filter and a condition comprising an adaptive value associated with the action;
    generating a structured query based on the filter;
    issuing the structured query to a data repository; and
    receiving search results from the data repository in response to the structured query.

2. The method of claim 1, wherein the action understanding model includes a plurality of layers, wherein the word embedding layer comprises an initial layer of the plurality of layers.

3. The method of claim 2, wherein the plurality of layers includes one or more hidden layers, the hidden layers comprising bidirectional long short-term memory (LSTM) layers.

4. The method of claim 3, wherein at least one of the hidden layers comprises a dense layer having a corresponding dropout hyperparameter.

5. The method of claim 1, further comprising: generating a label for the search query using a first neural network; generating a named entity in the search query using a second neural network; and including outputs of the first neural network and second neural network in the structured query.

6. The method of claim 5, wherein the first neural network includes an ELMo embedding layer and the second neural network includes a Global Vectors for Word Representation (GloVe) embedding layer.

7. A non-transitory computer-readable storage medium for tangibly storing computer program instructions capable of being executed by a computer processor, the computer program instructions defining steps of:
    inputting a search query from a client into an action understanding model, the action understanding model including an action embedding layer, the action embedding layer comprising word embedding layer constructed using a plurality of action terms;
    receiving, from the action understanding model, a filter match, the filter match including a type of filter and an action-condition pair, the action-condition pair comprising an action associated with the type of filter and a condition comprising an adaptive value associated with the action;
    generating a structured query based on the filter;
    issuing the structured query to a data repository; and
    receiving search results from the data repository in response to the structured query.

8. The non-transitory computer-readable storage medium of claim 7, wherein the action understanding model includes a plurality of layers, wherein the word embedding layer comprises an initial layer of the plurality of layers.

9. The non-transitory computer-readable storage medium of claim 8, wherein the plurality of layers includes one or more hidden layers, the hidden layers comprising bidirectional long short-term memory (LSTM) layers.

10. The non-transitory computer-readable storage medium of claim 9, wherein at least one of the hidden layers comprises a dense layer having a corresponding dropout hyperparameter.

11. The non-transitory computer-readable storage medium of claim 7, the steps further comprising: generating a label for the search query using a first neural network; generating a named entity in the search query using a second neural network; and including outputs of the first neural network and second neural network in the structured query.

12. The non-transitory computer-readable storage medium of claim 11, wherein the first neural network includes an ELMo embedding layer and the second neural network includes a Global Vectors for Word Representation (GloVe) embedding layer.

13. A device comprising:
    a processor configured to:
        input a search query from a client into an action understanding model, the action understanding model including an action embedding layer, the action embedding layer comprising word embedding layer constructed using a plurality of action terms;

receive, from the action understanding model, a filter match, the filter match including a type of filter and an action-condition pair, the action-condition pair comprising an action associated with the type of filter and a condition comprising an adaptive value associated with the action;

generate a structured query based on the filter;

issue the structured query to a data repository; and receive search results from the data repository in response to the structured query.

14. The device of claim 13, wherein the action understanding model includes a plurality of layers, wherein the word embedding layer comprises an initial layer of the plurality of layers.

15. The device of claim 14, wherein the plurality of layers includes one or more hidden layers, the hidden layers comprising bidirectional long short-term memory (LSTM) layers.

16. The device of claim 15, wherein at least one of the hidden layers comprises a dense layer having a corresponding dropout hyperparameter.

17. The device of claim 13, the processor further configured to: generate a label for the search query using a first neural network; generate a named entity in the search query using a second neural network; and include outputs of the first neural network and second neural network in the structured query.

* * * * *